Figure 1:
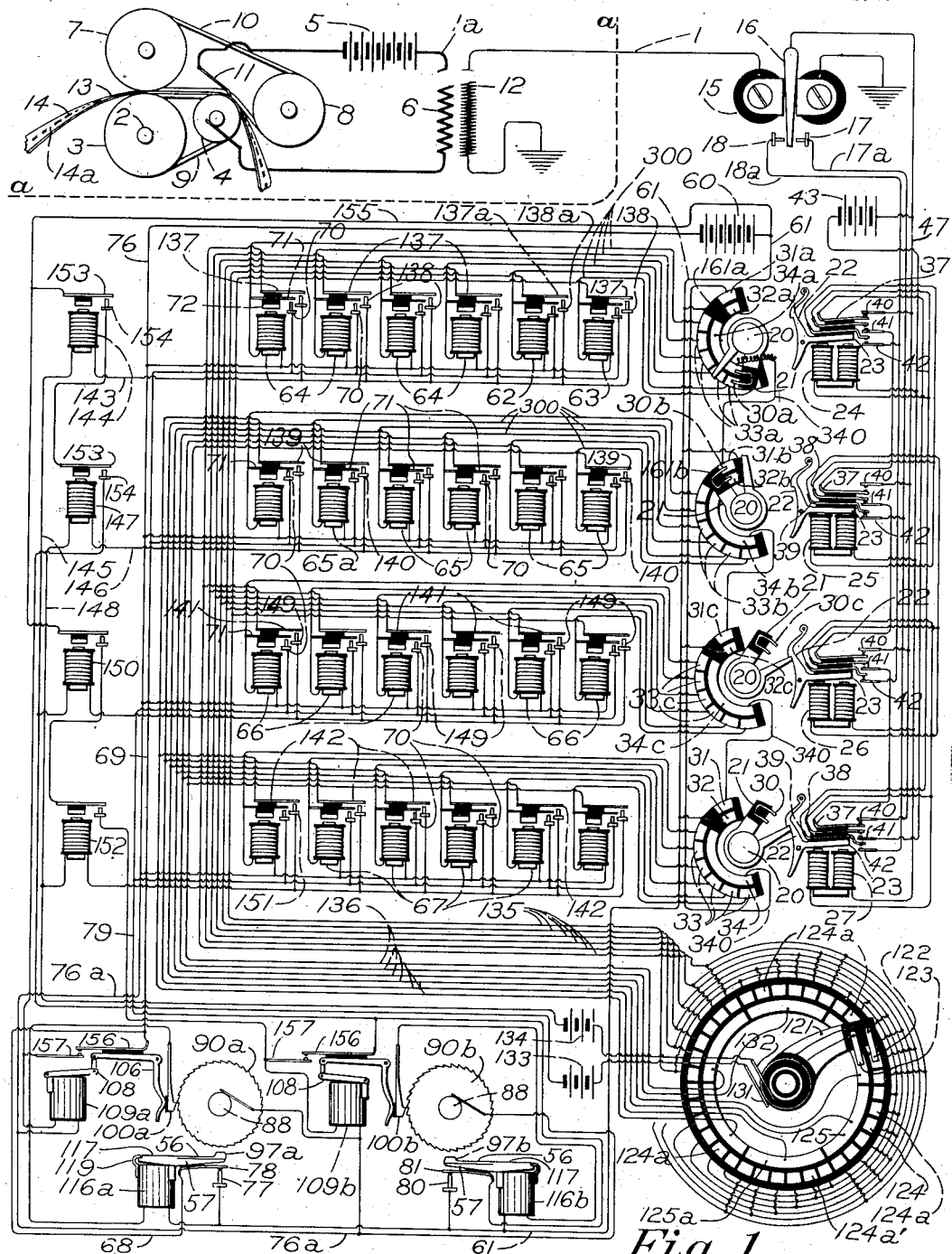

A. H. & R. W. BUMSTEAD.
TELEGRAPHY.
APPLICATION FILED MAY 1, 1911.

1,187,035.

Patented June 13, 1916.
4 SHEETS—SHEET 1.

Witnesses

Inventors
Albert H. Bumstead.
Ralph W. Bumstead.

A. H. & R. W. BUMSTEAD.
TELEGRAPHY.
APPLICATION FILED MAY 1, 1911.

1,187,035.

Patented June 13, 1916.
4 SHEETS—SHEET 2.

Witnesses

Inventors
Albert H. Bumstead
Ralph W. Bumstead

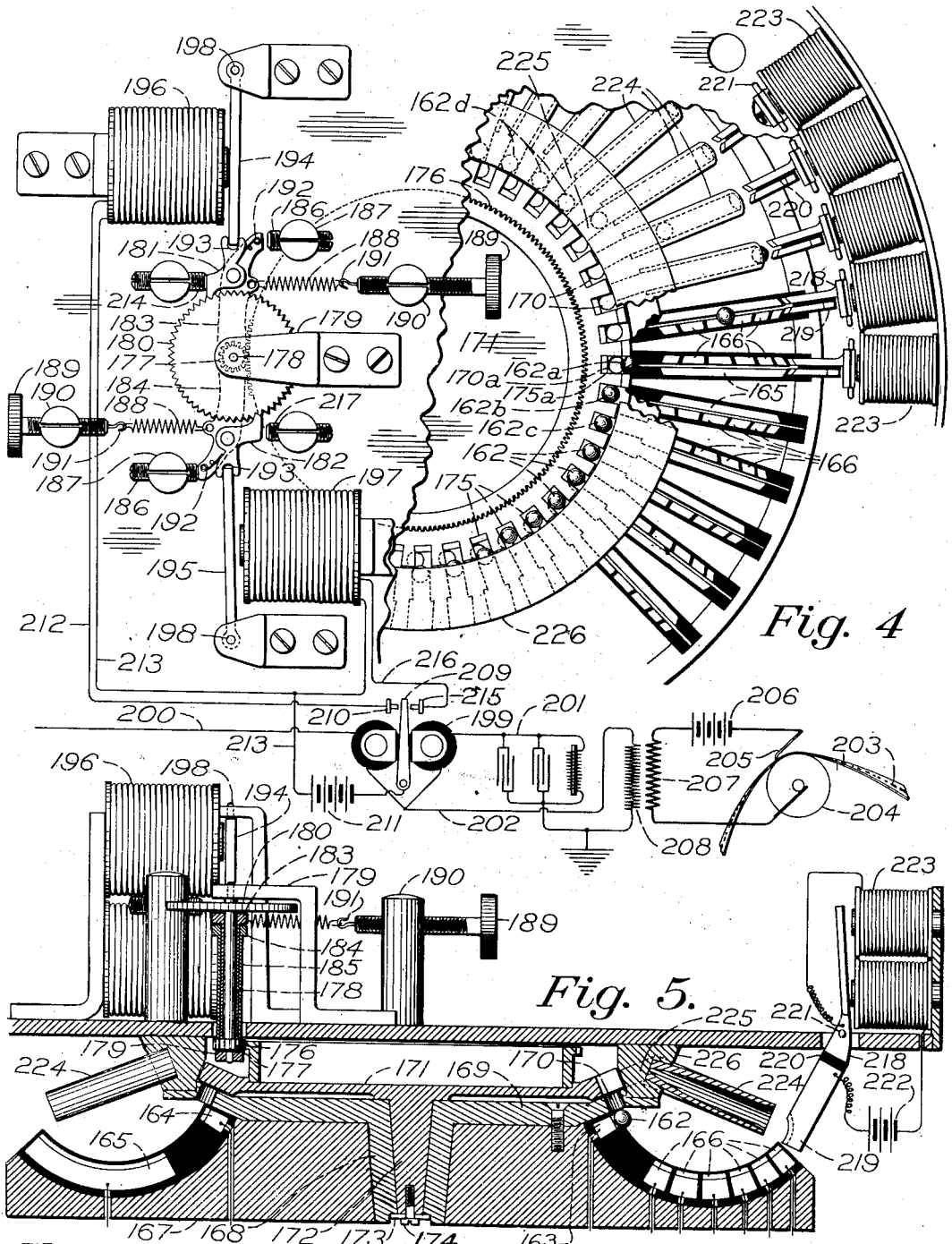

UNITED STATES PATENT OFFICE.

ALBERT H. BUMSTEAD, OF TOWNSEND, AND RALPH W. BUMSTEAD, OF BROOKLINE, MASSACHUSETTS.

TELEGRAPHY.

1,187,035.  Specification of Letters Patent.  Patented June 13, 1916.

Application filed May 1, 1911. Serial No. 624,314.

*To all whom it may concern:*

Be it known that we, ALBERT H. BUMSTEAD, of Townsend, in the county of Middlesex and Commonwealth of Massachusetts, and RALPH W. BUMSTEAD, of Brookline, in the county of Norfolk and Commonwealth aforesaid, both citizens of the United States, have invented certain new and useful Improvements in Telegraphy, of which the following is a specification.

The object of our invention is to provide a system of telegraphy which does not require skilled operators for the transmission and reception of messages; which is adapted to utilize a single wire between two or more stations for the transmission of intelligence at an extremely rapid rate; which is free from many of the difficulties of other rapid telegraph systems, such as, for instance, keeping the apparatus of the receiving station "in step" with that of the sending station, or such as the difficulty of preventing static and inductive line troubles; and furthermore to provide means whereby (and without the aid of a receiving operator) a message may be received at the desired station and automatically typewritten in page form ready for delivery to the addressee.

Our system of telegraphy is adapted for use in connection with many of the practices well known in the art of telegraphy. For instance, it is possible to use in our system the ordinary means of duplexing, making a line available for simultaneous rapid telegraphy in opposite directions. Our system is also applicable to the distant operation of typesetting machines and similar devices which can be provided with a separate magnetic control for each key.

In carrying out our invention we propose to employ a transmitting device which is capable of sending over the line a rapid succession of impulses all alike with reference to their duration, alternating successively in polarity and timed at varying intervals from one another, and also to use a receiving apparatus capable of automatic detection of said differences in time intervals and translation thereof into understandable signals. The varying time intervals may be in accordance with any suitable code and in order to illustrate the principle of the invention we have shown it herein as in accordance with a code wherein each pair of successive time intervals represents a letter, figure or other character, although we wish it understood that the principle of the invention might be embodied in a system in which each character was represented by the combination of more than two time intervals.

The successive impulses alternating in polarity may be secured in any well known way, as by making and breaking the current through the primary coil of an induction coil, the secondary coil of which is connected to the line circuit.

We have herein shown a transmitting tape for making and breaking the circuit, which tape may be either embossed or provided with perforations which cause the making and breaking of the circuit in a well known way. The variations in time intervals between the impulses that are sent over the line are secured by the length and spacing of the embossed portions or perforations of the tape.

As stated above, in the embodiment of the invention herein illustrated each character to be transmitted is indicated by the combination of two or more successive impulses, and our receiving apparatus is so constructed that it will not only detect any impulse sent over the line but will translate the combination of time intervals elapsing between three or more successive impulses. In our preferred embodiment we also provide means for indicating such translation in legible form. This indication can conveniently be made by printing the translation and for this purpose we have illustrated our receiving apparatus as having associated therewith a plurality of type wheels and means to set and operate said wheels to print the characters as fast as they are transmitted over the line.

By availing ourselves of varying time intervals between the impulses as a means of signaling, it is practicable to maintain a high degree of uniformity in the amplitude and other characteristics of the line impulses, and thus to secure the best possible conditions for high speed telegraphy.

The devices presently to be described are designed with a view toward minimizing the number of impulses representing a given message, and maximizing the speed of transmission and consequent efficiency of the line.

We prefer to use a signaling impulse whose characteristic is of approximately the sine wave form, that is, an impulse the electromotive force of which gradually rises from and falls to the zero point and after one semicycle is followed by another impulse of opposite polarity which completes the cycle on arrival at the zero point again. Impulses such as this are capable of transmission over a long line at a rate of speed which the static and inductive properties of the line would render prohibitive for our system in the case of impulses of any other characteristic.

These and other features of this invention will now be fully described, reference being had to the accompanying drawings in which—

Figure 2:
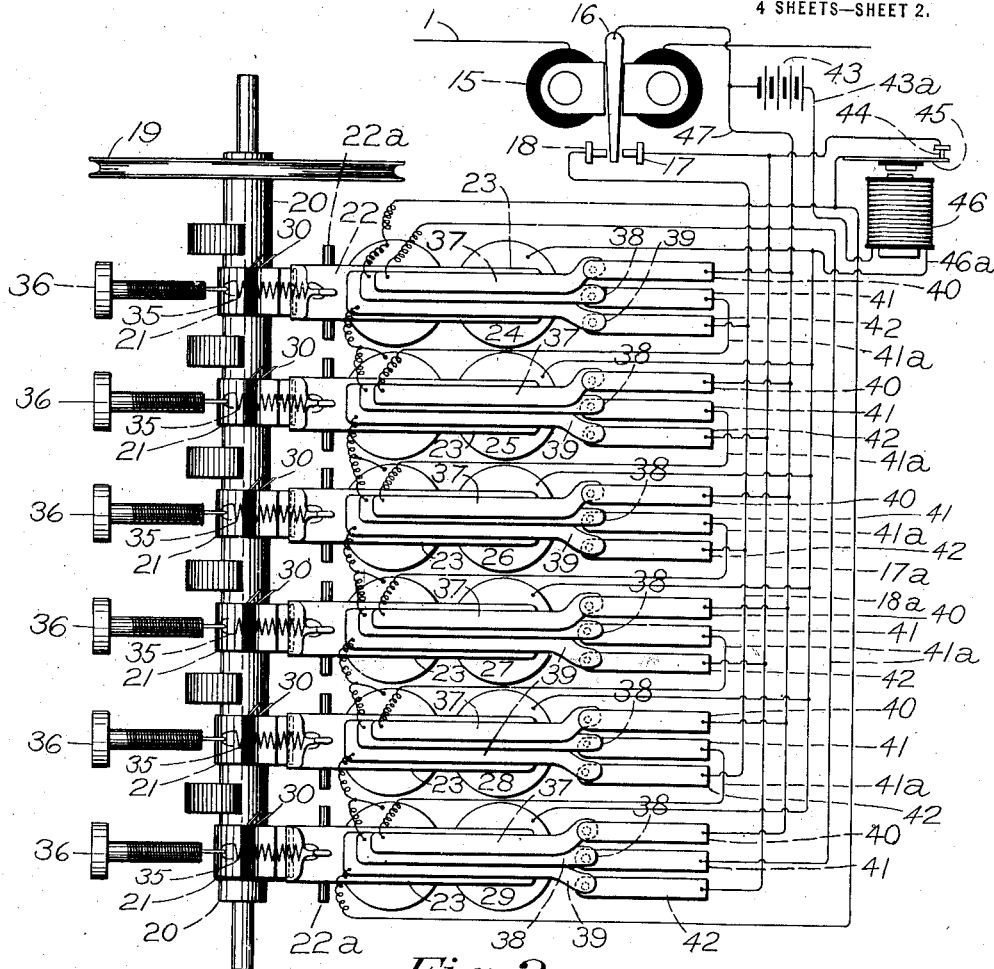
Figure 3:
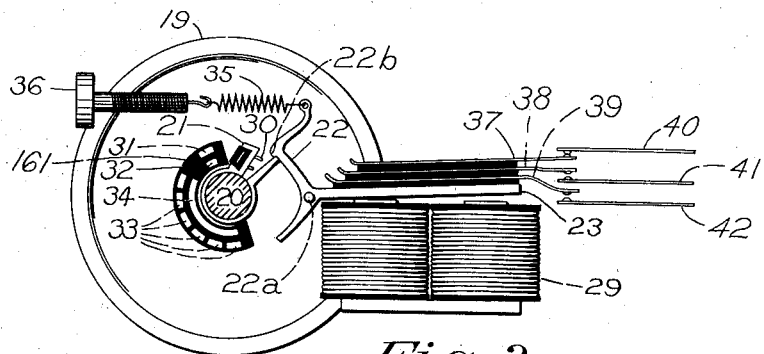
Figure 6:
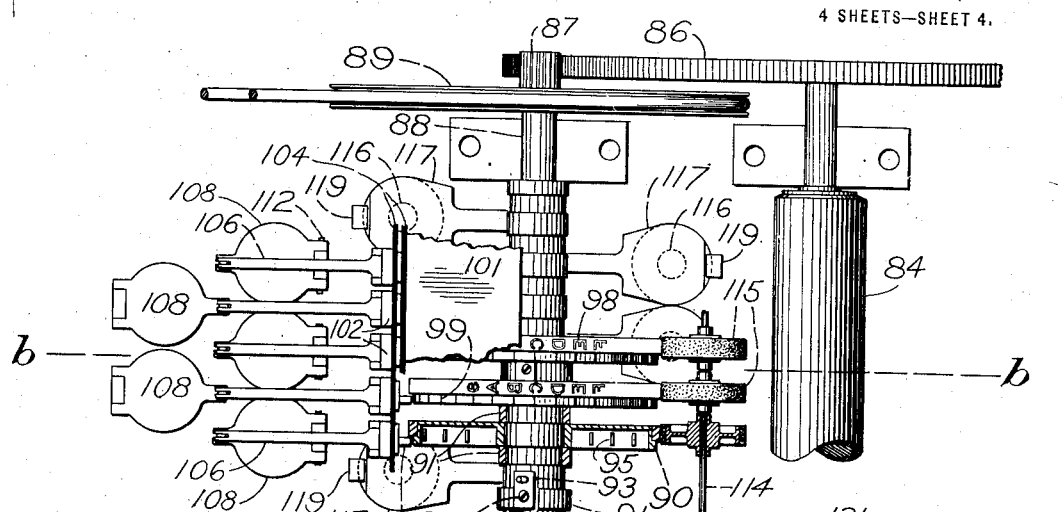
Figure 7:
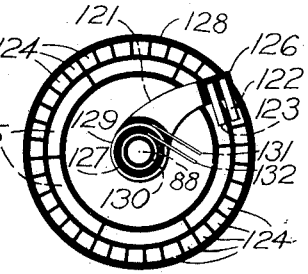
Figure 8:
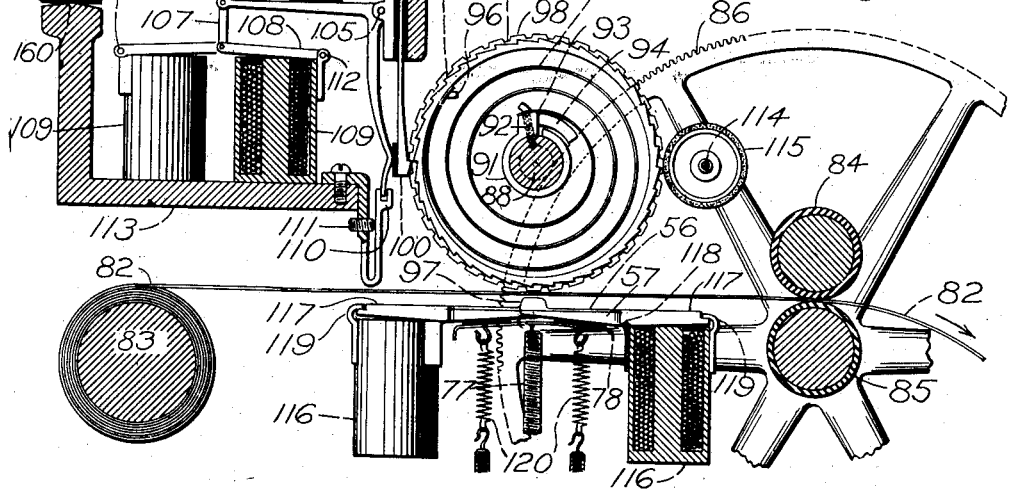
Figure 9:

Figure 1 is a diagram representing the principle of transmitting and receiving messages by means of our invention; Fig. 2 is a plan view of one embodiment of our improved receiving device showing how the signals transmitted over the line may be detected and distributed in rotation to a number of printing units; Fig. 3 is an elevation view of the parts shown in Fig. 2. Fig. 4 is a plan view of an alternative embodiment of our improved receiving device, showing also how the duplex system may be utilized; Fig. 5 is a vertical section of the parts shown in Fig. 4; Fig. 6 is a plan view of a portion of the printing mechanism; Fig. 7 is an elevation view of a sunflower switch shown in section in Fig. 6; Fig. 8 is a vertical cross section on the line $b$—$b$, Fig. 6; Fig. 9 is an enlarged view of a portion of the transmitting tape.

Referring first to Fig. 1, that part of the diagram above and to the left of the broken line $a$—$a$ represents a transmitter at one of two or more stations on a line 1; the remainder of the figure represents the receiving apparatus at another station on said line.

For generating impulses in the circuit line 1 we preferably employ a local circuit $1^a$ connected to a source 5 of direct current, and having therein the primary winding 6 of an induction coil, the secondary winding 12 of which is in the line circuit 1, and we provide means for making and breaking said local circuit $1^a$. This means is herein shown as a contact wiper 11 which is connected to one side of the local circuit $1^a$ and rests on a tape 13 of non-conducting material that passes over a pulley 4 which has a metallic periphery in electrical connection with the other side of said local circuit. The tape may be either perforated or embossed and is so arranged that as it is fed over the pulley 4 the perforations or embossed portions thereof will coöperate with the wiper 11 to make and break the circuit $1^a$. As herein shown the tape 13 is provided with perforations 14 which are situated to pass under the wiper contact 11 as the tape is fed forward so that when a perforation comes in line with the wiper it drops therethrough and comes in contact with the pulley 4, thus closing the circuit $1^a$. When an imperforate portion of the tape comes under the wiper 11 the contact between the latter and the pulley 4 will be broken, thus breaking the circuit $1^a$. The tape may be fed forward by any suitable means. Herein we have shown the pulley 4 as connected to a driving pulley 3 mounted on a driving shaft 2, by means of a belt 9 on which the tape 13 rests. Another pair of pulleys 7 and 8 are shown connected by a belt 10 which works in substantial engagement with the belt 9, said tape 13 passing between said belts and being fed thereby.

It will now be seen that whenever the primary circuit is closed by the dropping of the contact 11 into a perforation 14, the rise of potential will induce a momentary impulse in the secondary winding 12 of the induction coil, and this impulse will be transmitted over the line 1, while when the contact 11 is lifted out of a perforation 14 of the transmitting tape 13, the drop of potential in the primary coil 6 will induce another momentary impulse in the secondary coil 12 and over the line 1. This impulse will, however, be of opposite polarity to that of the impulse which was caused by the closing of the primary circuit, the advantage of which will be referred to later.

With such an arrangement the length of the time interval between the making and subsequent breaking of the local circuit $1^a$ depends on the length of the perforation 14, and the length of the time interval between the breaking and subsequent making of said circuit depends on the length of the space $14^a$ between any two perforations.

As stated above we propose to utilize as a code of signals the combination of various time intervals elapsing between successive impulses transmitted over the line, and in the selected embodiment of the invention which is herein illustrated, each signal comprises the combination of two time intervals separated by line impulses of one polarity, while an impulse of the opposite polarity separates successive signals.

By varying the length of the perforations we shall have various time intervals, say, between each positive impulse and the succeeding negative impulse while various spaces between the perforations will give us corresponding time intervals between each negative impulse and the succeeding positive impulse. Each signal can, therefore, be represented by a single perforation together with the space separating it from the next perforation. If we use six degrees of variation in the time intervals elapsing between successive impulses, it is possible to transmit any one of thirty-six characters with every perforation of the tape. With $n$ degrees of variation we may transmit any one of $n^2$ characters with each perforation.

Since each signal is represented by a single perforation together with the space separating it from the next perforation, it will be noted that the code of signals above described is one in which the termination of one signal constitutes the initiation of the next succeeding signal. The signals are thus contiguous signals with no time space elapsing between successive signals, and every time element in the signals is a significant time element, that is, a time element which has some definite meaning in the interpretation of the signals. In other words, the end of the space separating two perforations constitutes the end of one signal, and this also constitutes the beginning of the next signal, so that the impulse produced by the contact of the wiper 11 with the pulley 4 when said wiper passes off from the space on the tape 13 between two perforations therein and passes into the perforation constitutes not only the termination of one signal, but the initiation of the succeeding signal. This impulse thus forms part of two signals, thus making the signals contiguous and causing them to follow each other without the elapse of any time interval, however small, between successive signals.

The line 1 is herein shown as leading to a polarized relay 15 at the receiving station, the armature 16 of which is adapted to make contact with either one of two contacts 17 and 18, and the operation of which will be presently described.

We could, if desired, transmit the above described impulses directly over the line 1 to a receiving relay 15, but, instead we prefer to employ a transformer at the transmitting end, whose primary winding 6 is included in the above described tape-controlled circuit 1ª, and whose secondary winding 12 is grounded at one end and connected at the other end with the line 1. According to the well known principles of transformers, it will be seen that the instant a circuit is closed through the primary 6, the electromotive force thereof will suddenly increase from zero to a certain maximum point, and during such increase of potential a current will be induced in the secondary 12, line 1, and receiving relay 15. Instead of grounding the two ends of the secondary circuit, a return wire may, of course be used.

It is a well known fact that the effects of capacity and inductance of a long telegraph line are such as to prolong an impulse appreciably after the cessation of the energizing force which produced it. But if impulses of opposite polarity are made to follow one another, each impulse will have the effect of clearing the line of the static charge previously imparted to it. The receiving relay 15 can therefore be made to vibrate with extreme rapidity.

One advantage of using the induction coil is to provide an economical mode of transmission by using a greater number of turns in the secondary winding than in the primary, thereby increasing the potential of the line over that of the local circuit through the primary, and giving the greatest efficiency of the line circuit for the amount of energy supplied to the primary.

The relay 15 constitutes means for detecting the impulses which come over the line 1 as above pointed out. Associated with said detecting means is an interpreting mechanism arranged to interpret the variations in time intervals between the impulses and also a printing or other indicating mechanism to print or indicate the interpretations.

We will now describe the interpreting device herein shown. It might be well, however, to re-state the fact that in the system shown the signal for each character consists of two time intervals separated by a line impulse of one polarity while an impulse of the opposite polarity separates successive signals; and by the term "signal" as herein used we mean the total of impulses and time intervals that are required to indicate any individual character.

The interpreting mechanism comprises a distributing switch mechanism which is set in operation by the successive impulses and which distributes said impulses among a plurality of interpreting relays, which are arranged in groups or sets. When each signal is indicated by the combination of two successive time intervals, we arrange our relays so that two sets of relays are necessary to properly interpret any single signal.

The first impulse sets the distributing switch in operation, the second impulse causes the switch to close the circuit through some one of the relays of the first group, that depending on the length of the time interval between said impulses, and the third impulse which marks the end of the second time interval, causes the distributing switch to close a circuit through some one of the relays in the second group, that depending on the length of said second time interval. The particular combination of relays that is rendered operative, therefore, gives the interpretation of the signal.

In order to illustrate the principle of the invention we have shown in the drawings a construction having four groups or sets of interpreting relays, with the groups arranged in two pairs of groups. The relays of one group of one pair of groups are designated 62, 63, 64, and those of the other group of the pair are designated 65, 65ª. The relays of one of the groups of the other pair of groups are designated 66, and those of the other group of the pair are designated 67.

The distributing switch comprises a series of distributing contacts for each set or group of relays and a brush or movable contact to wipe over each set of distributing contacts. As shown in the drawings, these brushes are sustained by a shaft 20 which is constantly driven at a fixed speed by a pulley 19 thereon. This shaft carries a number of brush holders 21, one for each set of relays, which brush holders are arranged to bind the shaft just tightly enough to rotate therewith whenever free to do so, and to slip on the shaft when engaged with their respective escapements 22 (see Fig. 3). There is one such escapement for each brush-holder and each escapement is suitably pivoted at 22$^a$ and is acted on by a spring 35 which is secured to an adjusting screw 36. Each escapement is formed with a shoulder 22$^b$ which is normally held in engagement with the brush-holder by the spring 35, said shoulder thereby operating to hold the brush holder from rotating with the shaft. Each escapement has associated therewith an armature 23 which carries three contacts insulated from each other and which will be presently described. Each armature 23 is associated with a magnet, and there are, therefore, as many such magnets as there are brush holders or sets of relays. These magnets are designated 24, 25, 26, 27, 28 and 29, respectively, and they are electrically connected to the contacts 17 and 18 and to the contacts associated with the armatures in such a way that at the first impulse of, say, positive polarity coming over the line the magnet 24 will be energized, at the second impulse, which will be of opposite polarity from the first, the magnet 25 will be energized, at the third the magnet 26 will be energized, etc., magnets 24, 26 and 28 being energized only by positive line impulses, and magnets 25, 27 and 29 only by negative line impulses.

The contacts associated with each armature are designated 37, 38 and 39, and each set of these contacts coöperates with contacts 40, 41 and 42, respectively, said contacts being so arranged that when the armature is raised, as seen in Fig. 3, the contact 37 is in engagement with contact 40, while the contacts 38 and 39 are separated from the contacts 41 and 42, respectively. The contact 17 of the relay is connected by wire 17$^a$ to the contacts 42 associated with the magnets 25, 27 and 29, while the contact 18 is connected by the wire 18$^a$ with the contacts 42 of the other magnets 24, 26 and 28. The contact 41 for each magnet is connected by a wire 41$^a$ with the contact 37 of the next succeeding magnet, and all the contacts 40 are connected by a wire 47 with one side of a battery or other source of electrical supply 43 and also to the tongue 16 of the relay. The other side of said battery 43 is connected by a wire 43$^a$ with a starting relay 46 and the latter is connected by a wire 46$^a$ with each of the magnets 24, 25, 26, 27, 28 and 29. The armature of the relay 46 controls a contact 45 which is connected to the magnet 24 and also to the contact 39 of the magnet 29, and which normally engages a contact 44 connected to the contact 17.

With the construction above described the first impulse of, say, positive polarity which comes over the line 1 will operate the relay 15 and cause the tongue 16 to move against the contact 17 with the result that a starting circuit is closed from the source of current 43 through contacts 44 and 45 of the relay 46 and thence through magnet 24 and relay 46 returning to the source 43. The energizing of the magnet 24 draws down its armature, thus bringing the contacts 38 and 39 thereon into engagement with the contacts 41 and 42. A circuit will thus be established from the battery 43 through line 47 to contact 40 of the magnet 25, contact 37 of said magnet, wire 41$^a$ to contact 41 and contact 38 of magnet 24 (said contacts having been closed together by the energizing of magnet 24) and thence to said magnet 24 and relay 46 to 43 as before.

The starting circuit above described through contacts 44 and 45 is broken immediately upon the energization of the relay 46 and is not utilized again during the transmission of the message unless some one of the magnets 24 to 29 should fail to operate in response to a signal to which it might be assigned.

A succeeding line impulse through relay 15 of opposite polarity to the first, will draw the tongue 16 against contact 18, thereby closing a circuit from source 43 through contacts 42 and 39 of the magnet 24 (this circuit having been closed here by the energization of magnet 24) to the magnet 25, returning to source 43 through relay 46. Magnet 25 will now become energized and locked in operative position by the closing of a locking circuit through line 47 and contacts 40, 37 of magnet 26, wire 41$^a$, contacts 41 and 38 of magnet 25 to the magnet 25, returning as before to source 43. At the same time, the locking circuit for magnet 24 will be broken by the separation of contacts 40 and 37 of magnet 25, and thus the armature of said magnet 24 will be restored to its normal position.

Another impulse through contact 17 will be transmitted through contacts 42 and 39 of the magnet 25 direct to magnet 26 and return to source 43 through relay 46. In like manner with each succeeding movement of the relay tongue 16, one of the magnets 24–29 inclusive will be energized, while the one previously energized will be released. The end magnet 29, when energized, breaks contact between springs 37 and 40 thereof, thereby releasing magnet 28; it closes its own locking circuit from line 47 through springs 40 and 37 of magnet 24, and through springs 41 and 38 to magnet 29 itself; and makes contact between springs 42 and 39 preparatory to the closing of a circuit through the latter from contact 17 to magnet 24.

From the above it will be seen that the first impulse of, say, positive polarity sent over the line 1 will operate to energize the magnet 24, the second impulse will operate to energize the magnet 25, the third impulse will operate to energize the magnet 26, etc., said magnets being energized successively and in order.

As each magnet is energized and its armature attracted, the corresponding brush holder 21 will be released and will begin to be carried forward by the shaft 20 and the time interval elapsing between the releasing of successive brush holders corresponds to the time interval between the successive impulses over the line 1.

Throughout all the switching of circuits just described, it will be seen that, theoretically, there will be no interruption of the current flowing through relay 46, but should any one of the springs fail to make contact, the relay 46 will be deënergized, thereby closing the starting circuit again through contacts 44 and 45, and hence the interruption in the successive energization of magnets 24—29 will be only momentary.

Each brush holder carries an insulated U-shaped brush, and these brushes are designated 30, 30ª, 30ᵇ, 30ᶜ in Fig. 1. Each brush is adapted to wipe over a series of distributing contacts that are connected by wires 300 with the interpreting relays of the corresponding group, there being as many of said distributing contacts for each brush as there are interpreting relays in the corresponding group. In the construction shown in Fig. 1 there are six such contacts for each brush. The distributing contacts corresponding to the first group of interpreting relays are designated 33ª, those corresponding to the second group of relays 33ᵇ, those corresponding to the third group of relays 33ᶜ, and those corresponding to the fourth group 33. The contacts of each group are arranged in a segment of a circle, and have associated with them a long contact (these long contacts being designated 34ª, 34ᵇ, 34ᶜ and 34, respectively). The long contact of each group is connected by a wire 340 with one of a pair of initiating contacts associated with the next succeeding brush. These pairs of initiating contacts are designated 31ª, 32ª, 31ᵇ, 32ᵇ, 31ᶜ, 32ᶜ, and 31, 32, respectively.

From the above it will be seen that when the magnets 24 to 29 are successively energized as described, first one brush holder and then another will be released thereby to carry their brushes over first the initiating and then the distributing contacts, and the degree of advance of one brush over the next succeeding brush depends upon the length of the time interval between two succeeding impulses sent over the line 1.

Fig. 1 shows a brush 30ª just completing an excursion over its contact segment, while the brush 30ᵇ is beginning a similar excursion, having just been released by the magnet 25 which is shown with its armature locked down. The passage of brush 30ᵇ into contacts 31ᵇ and 32ᵇ closes a circuit which may be traced from the source 60, through conductor 61, contact 32ᵇ, brush 30ᵇ, contacts 31ᵇ and 34ª, brush 30ª, contact 33ª, and thence to a relay 62, returning to the source 60 via conductor 76.

A lesser interval of time elapsing between the moments of despatching the two brushes 30ª and 30ᵇ would have caused the above described circuit to be directed into one of the relay magnets 64, while a slightly longer time interval would have allowed the brush 30ª to reach the contact which is a terminal for the magnet 63, before the impulse is initiated by the contact made between brush 30ᵇ and contacts 31ᵇ and 32ᵇ. Hence, the magnets 62—64 inclusive are caused to detect the relative length of time elapsing between the initiation of two successive line impulses, which (in the case just described) may be communicated respectively to the magnets 24 and 25.

The length of the time interval elapsing between the second and third impulse will be similarly detected by the relays 65, 65ª, for the length of this time interval will determine the position of the brush 30ᵇ when the brush 30ᶜ is in engagement with the initiating segments 31ᶜ, 32ᶜ, and consequently which one of the relays 65, 65ª will be energized.

Since in the system herein illustrated each signal is represented by the combination of two successive time intervals, it follows that the particular combination of relays in the two groups 62—64 and 65, 65ª which is called into play will give an interpretation of the signal sent over the line 1.

In the same way the interpretation of the next signal is given by the particular combination of relays that is called into play in the groups of relays 66 and 67.

Now since the actuating impulse for any of the magnets 62—64 is of very short duration and since these magnets serve their purposes at some moment subsequent to being energized, it is therefore necessary to lock them in operative position when once they are energized. For this purpose a locking circuit is provided which may be traced from the source 60 through conductor 61 to a pair of contacts 77 and 78 (which will presently be shown to be utilized as a circuit-breaker), at the bottom of Fig. 1, and thence through conductors 68 and 69 to all the contacts 70, these latter being associated with companion contacts 71 which are connected respectively with the magnets 62-64 inclusive.

Now whenever an initiative impulse comes from one of the contacts 33ª to energize one of the magnets 62—64, the armature 72 of that magnet in being attracted will bring its contact 71 in touch with the live contact 70, and the locking circuit will pass through the magnet and back to the source 60 through the conductor 76, thus retaining the magnet in energized condition until same is made use of.

Once more, let us refer to the U-shaped contact brush 30ᵇ, and note its service after it has played its part in the selection of one of the magnets 62—64 inclusive by passing over the contact segments 31ᵇ and 32ᵇ. It now begins an excursion over the segments 33ᵇ which it successively connects with segment 34ᵇ, the latter being electrically connected to a segment 31ᶜ on the system controlled by magnet 26. During the passage of brush 30ᵇ over contacts 33ᵇ, the brush 30ᶜ will be despatched on its round of contact making, and first it will connect the segment 31ᶜ with the source 60 through conductor 61, a branch from which connects with the segment 32ᶜ. A complete circuit is closed, accordingly, from the source 60 through conductor 61, segment 32ᶜ, brush 30ᶜ, segments 31ᶜ and 34ᵇ, through some one of the segments 33ᵇ (depending upon the length of time having elapsed between the despatch of the brush 30ᵇ and brush 30ᶜ), and thence the circuit may be traced through some one of the magnets 65 and return wire 76 to source 60.

The magnets 65 are provided with contact springs 71 on their armatures, and companion contacts 70, so that when operated they will receive a locking impulse in the same manner as described above for the locking circuits of magnets 62—64 inclusive. In fact, there is a common conductor 69 for all the contacts 70 associated with the twelve magnets 62—65 inclusive.

As the line impulses follow one another in rapid succession, the magnets 24—27 inclusive will be energized in continuous rotation and the time interval elapsing between every line impulse and its predecessor will determine which of the magnets 62—67 are locked in position for controlling the printer mechanism hereinafter described.

Each of the magnets 62—64 acting in combination with one of the magnets 65 will select a different character to be printed in the first space of a line, while the combined action of one of the magnets 66 with one of the magnets 67 will result in selecting the character to be printed in the second space of the line.

A locking circuit 79 common to all the magnets 66 and 67 for the second letter of the line is normally connected with the source 60 through the conductor 61 and circuit-breaking contacts 80 and 81. Accordingly, there is a separate locking circuit and circuit breaker for each group of magnets comprising the character selectors for a single space in the line. This enables us to restore the magnets 62—67 inclusive to their normal positions immediately after the printing of the selected characters, as will be presently shown. Hence, a full line of the page will be printed with one round of signals delivered to the full set of magnets 24—29 inclusive, while the actuated detector magnets 62—67 inclusive will be restored in pairs, prior to being again utilized in the selection of characters to be printed on the next line.

Here, we will again digress from Fig. 1 to describe some of the details of Figs. 6, 7 and 8 which are important to understand at this juncture.

The printing mechanism comprises a plurality of type wheels 90 mounted on a shaft 88 and means for operating said type wheels by which one relay of the group 62, 63, 64 coöperating with one relay of the group 65, 65ª causes a certain character or type on one type wheel to make an impression, and one relay of group 66 coöperating with one relay of group 67 causes a certain character or type on the next type wheel to make an impression. The particular character which is printed by any type wheel is determined by the particular combination of relays that is called into play. In other words, the printing mechanism is arranged to print the interpretation of the signals which is made by the interpreting relays.

Referring to the constructional details of the printing mechanism, it will be seen that a roll of blank paper 82 (Fig. 8) is carried on the spool 83, and is fed in the direction of the arrow between two rollers 84 and 85 which are rotated continuously at a low speed, the roller 85 having on its shaft a gear 86 which meshes with a pinion 87 on the type wheel shaft 88. A pulley 89 keyed to the shaft 88 is belt connected with any suitable source of power, possibly the same as that which rotates the shaft 20 of the signal-detector described above.

Upon the shaft 88 are mounted as many type wheels 90 as there are to be spaces on a line, when written transversely of the tape 82. In order to permit the characters to be printed without blurring, in spite of a continuous rotation of the type wheel shaft 88, the type wheels 90 are loosely mounted upon said shaft and driven in the following way: Adjacent to the hub of each type wheel is a sleeve 91 which is secured fast to the shaft by a screw 92, and carries a lug 93 which engages with another lug 94 on the type wheel 90. Normally the two lugs 93 and 94 are pressed against each other by the tension of a coil-spring 95 which is secured at one end to the lug 92 and at the other end to a catch 96 projecting inwardly from the felly of the type wheel 90. This arrangement permits the type wheel to be momentarily arrested while the shaft continues to rotate, winding the spring 95 tighter, so that during the pause of the type wheel the paper 82 may be impressed against it by a printing platen 97, and after a character is thus printed and the type wheel 90 released, the tension of the spring 95 will quickly restore the type wheel to its proper position relative to the shaft, that is, with the two lugs 93 and 94 engaging each other. This printing operation will be performed and the type wheel released during a portion of one revolution of the shaft 88 so that in no case will the rotation of the lug 93 be obstructed by the lug 94, although both travel in the same path.

The rim of each type wheel 90 is provided with the type characters 98 and alongside thereof a set of ratchet teeth 99 which are adapted to engage with a pawl 100, the latter having a flexible stem and being mounted upon and insulated from a support 101 belonging to the framework of the printer. A clamp plate 102 when secured to the support 101 by the screw 103 may serve to clamp the pawls 100 between the insulating strips 104, while the plate 102 may also be provided with a bearing 105 for the lever 106, one arm of which is connected by a link 107 with the armature 108 of a magnet 109. There are as many magnets 109 as there are type wheels, and a shelf 113 is provided for the support of these magnets. The lower arm of each lever 106 is held in its normal position by the spring pawl 100 and by the yoke 110 which may be adjusted by means of a set screw 111. When the armature 108 (which is fulcrumed at 112) is drawn down by the energization of the magnet 109 the lever 106 is thereby caused to press against the insulated back of the pawl 100 and throw the latter into engagement with one of the ratchet teeth 99 on the type wheel 90. Thus it will be seen that the stopping of each type wheel 90 may be caused by the energization of its proper magnet 109, and if, as will be shown presently, the electrical impulse imparted to said magnet 109 is timed so as to catch the pawl 100 in a particular one of the ratchet teeth 99, then the character selected for printing will be that one whose type face on the type wheel is at the moment of stopping, opposite the printing platen 97.

Loosely mounted upon the shaft 114 is a set of ink rollers 115 which are allowed to turn independently of one another, being rotated by their respective type wheels against which they press, or held stationary when the individual type wheels are stopped for printing.

The printing platens 97 are controlled each by its own magnet 116. Each platen is connected by a spring 56 with its armature 117, which is fulcrumed on a knife edge 118 and is held against the latter by a spring 120, and a detent 119 affixed to the magnet 116. Since the paper 82 is moved continuously, it is preferable to have the platen 97 strike a blow and rebound immediately, this being accomplished by allowing a clearance for the paper between the type wheel and the platen at all times except when the platen is lifted by its momentum from a sudden impulse in the magnet 116, which causes the stiff armature lever 57 to impart a rapid motion to the platen 97. After the armature has been stopped by coming in contact with its magnet, the momentum of the platen 97 causes the latter to strike the paper and rebound immediately, coming to rest against the lever 57 without waiting for the armature to be restored to its normal position.

Fig. 7 shows what is known in this art as a sun-flower-switch, comprising (in this case, for example) two concentric rings having respectively thirty-six contact segments 124 and six contact segments 125, and a pair of brushes 122 and 123 adapted to wipe over the two rings respectively. The contact segments 124 and 125 are stationary, being supported in any suitable manner concentric with the shaft 88. This shaft carries a brush-holder 121 keyed to it and supporting the aforesaid brushes 122 and 123. Insulation 126, 127 and 128 provides electrical separation of the brushes from one another, also between the two collector rings 129 and 130, and between the several segments 124 and 125. The collector rings just mentioned are carried on the shaft 88 and are connected (as shown in Fig. 1) so as to provide a path for current from a stationary brush 131 to the revolving brush 122, also from a stationary brush 132 to the revolving brush 123.

Referring again to the electrical circuits shown in Fig. 1, it will be noted that current is supplied to the two brushes 122 and 123, respectively, from two independent sources 133 and 134. The brush 122 connects the source 133 in rotation to six conductors 135, each of which is connected with every sixth segment 124. Likewise, the brush 123 connects the source 134 in rotation to six conductors 136 each of which is connected with one of the long segments 125. Hence, during a complete revolution of the type wheel shaft 88 and trailer arm 121, the source 133 will be connected six times with each of the conductors 135, while the source 134 is connected once with each of the conductors 136. Moreover, due to the arrangement of the connections as shown, each revolution of the trailer arm 121 will give us successively thirty-six different combinations of conductors 135 fed simultaneously with conductors 136.

Now it should be noted that each of the conductors 135 terminates in a contact spring 137, operated by one of the relays 62—64 inclusive and adapted to make connection with a companion contact 138. Similarly, the conductors 136 terminate in contact springs 139 operated by the relays 65 and adapted to make connection with companion contacts 140. Furthermore there is a branch circuit leading from each of the conductors 135 to the six contacts 141 controlled respectively by the six relays 66, while other branch circuits connect the conductors 136 with the contacts 142 controlled by the relays 67.

As it will be remembered that the relays 62—65 are assigned to the interpretation of characters for the first space on a line, and that the relays 66 and 67 are assigned to a similar duty for the second space on a line, so it will be seen that for as many spaces as there are on the line there will be a duplication of the twelve relays 66 and 67, and corresponding branch circuits connecting their contacts 141 and 142 with the conductors 135 and 136, respectively.

To follow out these circuits still further, it will be seen that all of the six contacts 138 are connected with a common conductor 143 leading to a relay 144 and thence by a return circuit 145 to the source 133. Similarly the contacts 140 are all connected with a conductor 146 leading to a relay 147 and thence by a return conductor 148 to the source 134. And again, the contacts 149 connect with relay 150, while contacts 151 connect with relay 152, and the return circuits for the relays 150 and 152 are the same as above described for relays 144 and 147 respectively.

It will be remembered that in the detection of a line signal for the first character to be printed on a line, one of the relays 62—64 is locked in operative position and also one of the relays 65. We are now in a position to follow out the succession of events which results in the printing of the detected character. Suppose, for illustration, that in the code adopted, the letter W be represented by two time intervals elapsing between three successive impulses, and that the first interval consists of six units of time, while the second interval equals three units. In the first part of the signal, therefore, the U-shaped trailer brushes 30ª and 30ᵇ on the detector shaft will travel to the positions shown in Fig. 1 when they will coöperate to energize the relay 62 and lock it in operative position. The relay 62 in making connection between its contacts 137ª and 138ª will thereby create a path from the six sunflower segments 124ª that are connected in multiple to the relay 144. Hence the relay 144 will operate whenever the brush 122 wipes over one of the six segments 124ª. And for the second part of the signal for the letter W, the trailer brushes 30ᵇ and 30ᶜ on the detector shaft will coöperate to energize the relay 65ª, this being the relay which would interpret for the second part of the signal a time interval of three units' duration. This relay 65ª connects the relay 147 with the sunflower segment 125ª, and hence the relay 147 will not be operated until the brush 123 reaches this segment 125ª. In no event, however, will both relays 144 and 147 be simultaneously in energized position until the brush 122 is advanced to a point where it will wipe over the segment 124ª. In this position of the brush 122, however, the relays 144 and 147 will coöperate to close the circuit which includes the contact springs 153 mounted upon the armatures of the two magnets, together with their companion contacts 154. This circuit may be traced starting from the source 60, and passing via the conductor 155 to the contact springs 153 and 154 just mentioned (which are all in series) and thence to the magnet 109ª, returning directly to the source 60 via conductor 76ª. The magnet 109ª upon being thus energized will draw down its armature 108, and thereby actuate the pawl 100ª as described above (and shown in Fig. 6), the result being to arrest the motion of the type wheel 90ª (Fig. 11). At the same time a locking circuit for the magnet 109ª will be closed from the source 60 via conductor 61, circuit-breaking contacts 77 and 78, conductor 68, to a pair of contacts 156 and 157, and thence to the magnet 109ª and returning as before through conductor 76ª to source 60.

As shown in Fig. 8, each of the levers 106 is provided with an insulation block 158 upon which is mounted one of the springs 156, while the spring 157 is secured between pieces of insulation 159 which are screwed to the bracket 113, the upper portion of which has a ridge 160 permitting a rocking adjustment of the spring 157 and at the same time providing a firm base for the spring when adjusted to make proper contact with its companion 156.

It should now be clear that so long as a type wheel 90 is allowed to rotate freely with the shaft 88, the type faces will retain a fixed angular relationship to the trailer arm 121, and consequently the particular position of the brushes 122 and 123 on the sunflower segments 124 and 125 at the moment of actuating the magnet 109 will determine just which letter will be stopped over the printing platen 97 by the engagement of the pawl 100 with the type wheel 90. But it has been shown that the cooperation of the relays 144 and 147 to actuate the magnet 109 will be brought about only when the brushes 122 and 123 have reached those segments 124 and 125 which have been connected with the relays 144 and 147, respectively through the selective relays of the interpreting system. Hence, (to continue our illustration) the type wheel $90^a$ will as the result of the actuation of the magnet $109^a$ be stopped in position to print the letter W.

It remains now to show how the printing platen $97^a$ is actuated and the type wheel and several locking circuits are released. The magnet $116^a$ upon whose armature is the printing platen $97^a$ is in series on the one hand with the live conductor 61 coming from the source 60, and on the other hand with the pawl $100^a$. The shaft of the type wheel $90^a$ is connected with the conductor $76^a$ affording return of the circuit to the source 60. The actuation, therefore, of the pawl $100^a$, besides stopping the type wheel as above described, serves also to close a circuit for the printing magnet $116^a$. The paper 82 having been impressed upon the letter W-type face of the type wheel $90^a$, by the striking of the platen $97^a$, the locking circuit for the magnet $109^a$ and at the same time for the magnets 62–65 will be opened, since this circuit passes through the contacts 77 and 78 which are separated from each other as the printing platen makes its stroke, the contact spring 78 being mounted upon and insulated from the arm under said platen. On breaking the locking circuits, the restoration of relays 62 and $65^a$ will cause the relays 144 and 147 to become inert and the magnet $109^a$ will also be released withdrawing the pawl $100^a$ from engagement with the type wheel $90^a$, thus allowing the type wheel to rotate freely. The disengagement of the pawl $100^a$ from the type wheel $90^a$ breaks the circuit for the printing magnet $116^a$.

From the foregoing it should be clear how the next letter will be printed as the result of a similar succession of transmitting and relay operations, which might be summarized thus: (1) Initiation of impulses in a local transmitter circuit by means of a perforated tape. (2) Transformation of low-potential local impulses to higher potential line impulses which are detected by the receiving relay 15. (3) Distribution of two impulses to the magnets 26 and 27 respectively, which impulses taken with the next succeeding impulse operating magnet 24, define the limits of two time intervals elapsing between the despatching of contact-wipers $30^c$, 30 and $30^a$, and hence determine which one of the relays 66, and which one of the relays 67 will be actuated to interpret the signal. (4) Passing of the brushes 122 and 123 simultaneously over the two contact segments 124 and 125, which in combination correspond with the pair of interpreting relays 66 and 67, this position of the brushes being coincident with the position of the type wheel $90^b$ in which the latter should be arrested for the printing of the interpreted character, and coincident also with the coöperative actuation of relays 150 and 152, which results in the energization of magnet $109^b$ to stop the type wheel $90^b$. (5) Actuation of the printing magnet $116^b$ as the result of closing a circuit between the pawl $100^b$ and the type wheel $90^b$. (6) Breaking of the locking circuit for magnets $109^b$, 66 and 67 by means of the separation of contacts 80 and 81, which is concurrent with the printing stroke of the platen $97^b$, and hence the restoration to normal position of the magnets and relays coöperating to print the character, and the release of type wheel $90^b$ to rotate with the shaft 88.

It should be noted that there is no need for maintaining any sort of synchronism between the transmitter and the printer-shaft 88, and only an approximate correspondence in speed is necessary between the transmitter and the detector shaft 20.

Suppose that the tape is drawn through the transmitter at a speed such that the shortest perforation passes under the brush 11 in 1/120 of a second, while the longest perforation passes under in 7/120 of a second. Then the speed of the detector shaft 20 would normally be adjusted so as to carry the brushes 30 over six segments 33 and the space preceding them in 7/120 of a second, or at the rate of 120 segments per second. But if this speed were ten per cent. greater or less it would still be suitable for interpreting the signals correctly, since each time interval is measured by two successive impulses, and the cumulative error of a ten per cent. variation in speed either faster or slower would in no case cause the brush 30 to be more than 7/10 of one segment out of the way, while it would have to be a whole segment out of the way in order to mis-interpret a signal. In other words, the detector is synchronizing itself with the transmitter at every impulse. Moreover, owing to the different lengths of the signals and to the continuous rotation of the type-wheel-shaft 88, it is obviously out of the question to synchronize the type-wheel shaft with the detector, but instead, the printing operations are made to follow after and pick up the work of the detector, the speed of rotation of the type wheels being great enough so that even after the longest possible delay in printing the detected character, there will still be a margin of leeway before the same type wheel is assigned to the printing of another detected character.

With the various sets of relays 62–67 being operated in such rapid succession as is contemplated, it is easy to see that it would be possible for several of the characters of a line to be printed almost simultaneously, and if, for instance, the word POLE is interpreted by the relays while the beginning of the alphabet on the type wheels is opposed to the printing platens, then E would be the first letter to present itself for printing, while LOP would follow afterward, so that in point of time the word would actually be printed backward, although printed with the letters in the same order as received by the detector and therefore appearing correctly on the line. To look at it in another way, it will be seen that the interpreting relays 62–67 are actuated as fast as the signals are received, each set being assigned to a definite space on the line, and the relays remain set by their locking circuits until the brushes 122 and 123 pick up the interpreted signals and cause the characters to be printed in their respective spaces without reference to the temporal sequence of the printing strokes of the printing platens.

It will be remembered that the paper 82 is being fed along continuously for the purpose of presenting a blank space for the printing of each new line. In consequence of this the characters of each line will be somewhat staggered, or running down hill, so to speak, while words that are printed end first, as described above, will appear to be written uphill. It is possible to have the lines of sufficient length, however, and to rotate the type wheels at a sufficient speed so that the lack of alinement thus caused will be no obstacle to the legibility of the typewritten matter.

In order to make the spaces between words it will be observed that it is possible to transmit over the line a space signal consisting of two time intervals elapsing between three successive impulses, the time intervals being of shorter duration than any used in the character signals, and being, in fact, so short that three of the U-shaped brushes 30 upon being released will follow one another so closely as to avoid coöperation in actuating any of the interpreting relays 62–67. For instance, if the brushes 30$^a$ and 30$^b$ are released at the proper interval for a space signal, then 30$^a$ would be passing over the insulation segment 161$^a$, at the same time the brush 30$^b$ is making contact with segments 31 and 32. Consequently, there would be no complete circuit through any of the relays 62–64. And likewise, for the second part of the space signal, the brush 30$^b$ would be passing over the insulation segment 161$^b$ while brush 30$^c$ is passing over segments 31$^c$ and 32$^c$, the result being to leave all of the relays 65 free from actuation. Now since the magnets 24 and 25 together control the particular space on the line to which this space signal has been assigned, and since in this case they assign no duty to the interpreting and printing mechanism, it is evident that a blank space will be left and the subsequent signal will be assigned to the magnets 26 and 27 which control the next character space on the line.

Another means of spacing between the words of a message would be to dispense with the use of the insulation segments 161 for protecting the interpreting relays from actuation, and instead, allow the interpreting relays to be set in the usual way and stop the type wheel at a particular position which is left blank so as to leave no impression on the paper when the platen is actuated.

*The gravity detector.*—We come now to the alternative form of detector shown in Figs. 4 and 5. Here, in place of the above-described motor-driven U-shaped brushes 30, we may use metallic balls 162, propelled by gravity over the contact segments 163, 164, 165, 166, which are arranged in trough-like runways extending radially from the center of the mechanism. The base 167 is preferably circular in shape and at the center is provided with a cone bearing 168, which may consist of a bushing with a saucer-shaped flange 169 near the edge of which are drilled a number of holes 170 of sufficient size to allow the balls 162 to drop through, and in position to deposit a ball at the top of a contact trough and allow it to roll therein when released in an appropriate manner by the revolution of the wheel 171 whose cone pivot 172 is secured in the bearing 168 by means of a washer 173 and screw 174.

The edge of the wheel 171 is cut with rectangular slots 175 into which the balls 162 will just fit freely. The number of slots 175 is one greater than the number of holes 170 in the underlying flanges 169, in consequence of which the teeth between the slots 175 act as gates to admit but one at a time of the balls 162 to drop through their respective holes 170. The drawing shows a slot 175$^a$ exactly over the hole 170$^a$, the ball 162$^a$ having just been allowed to drop through. A very slight movement of the wheel 171 would result in completely uncovering the adjacent hole to admit ball 162$^b$, whereas a movement equal to the space between two slots 175 would result in dropping in rotation the whole set of balls 162, each in its appropriate trough.

The wheel 171 is cut with gear teeth 176 and is adapted to mesh with a pinion 177, the latter being mounted on a shaft 178 which is suitably pivoted in the supports 179. Made fast to the shaft 178 is a spur wheel 180 the teeth of which are adapted to engage with two pawls 181 and 182. These pawls are pivoted respectively in two arms 183 and 184, the latter being mounted upon concentric sleeves 185 which surround the shaft 178. The sleeves fit loosely one upon the other and upon the shaft 178, so that each of the three can turn independently of the others. The arms 183 and 184 are normally held by the springs 188 against the stops 186 which may be adjusted in their supporting posts 187 so as to allow the pawls 181 and 182 to be pressed between two teeth of the wheel 180. Adjusting screws 189 threaded into the posts 190 and carrying hooks 191 provide any desired tension upon the springs 188. Back of the pawls 181 and 182 and mounted upon the arms 183 and 184, respectively are two small springs 192 which press the pawls against the teeth of the wheel 180. The pawls 181 and 182 are also provided with yokes 193 which play over the edges of two magnet armatures 194 and 195, respectively, the latter belonging to the two magnets 196 and 197 and being pivoted as at 198.

Let us now consider the actuation of this detector as controlled by a duplex circuit. 199 (Fig. 4) represents a polarized relay connected on one side with another station through the line 200; on the other side with the artificial line 201 consisting of the well known arrangement of inductive resistance, condensers, and ground, to balance the real line, and in the middle of the relay winding is a tap circuit 202 connecting with a local transmitter similar to that described above and shown in Fig. 1. In Fig. 4 the perforated transmitting tape 203 is shown being drawn over the drum 204 and under the contact wiper 205 whereby a circuit is closed by every perforation, from the electrical source 206 through the primary winding 207 of an induction coil and thence to the drum 204, wiper 205 and in return to the source. Impulses induced by this transmitter in the secondary winding 208 of the same induction coil will be impressed upon both the artificial and the real lines through the relay 199 without affecting the latter. But impulses impressed upon the line 200 by a transmitter at another station will destroy the balanced condition between the real line 200 and the artificial line 201 and therefore become effective upon the relay 199 and cause its tongue 209 to be drawn to one side by a positive impulse, and to the other side by a negative impulse.

Suppose that to initiate a signal the tongue 209 is drawn by a positive impulse against the stop 210. It will thereby close a circuit from the source 211 through the tongue 209, stop 210, conductor 212, to the magnet 196 and thence return by conductor 213 to source 211. The armature 194 of the magnet 196 will be attracted and will move the pawl 181 against the stop 214, at the same time turning the wheel 180 through one-half the space of one of its teeth and permitting the pawl 182 to ride over a tooth. Such a movement of the wheel 180 will be communicated to the wheel 171 and will result in fully opening one of the holes 170, say 170ª, through which will drop a ball 162ª.

While the ball 162ª is rolling down its trough of contacts 163–166 inclusive, the second part of the signal consisting of a negative line impulse will be manifested by the actuation of the relay 199 whose tongue 209 will now be drawn against the stop 215. This will close a circuit from the source 211 through the tongue 209, stop 215, conductor 216, magnet 197, and thence via return conductor 213 to the source 211. The armature 195 of the magnet 197 will now be attracted and will carry the pawl 182 against the stop 217, thus turning the wheel 180 another half tooth space and moving the wheel 171 sufficiently to completely open the hole 170 beneath the ball 162ᵇ and allowing the latter to make an excursion over its contact trough in which is another set of contacts 163–166 inclusive.

The manner in which the two balls 162ª and 162ᵇ are made to coöperate in the detection of the first part of a signal, and likewise, how balls 162ᵇ and 162ᶜ coöperate to detect the second part of the signal will be understood by comparing the trough contacts 163–166 with contacts 31–34 inclusive of the detector first described and shown in Figs. 1 and 2. Thus, to give equivalents with reference to the functions of the contacts in the two devices:—163=31; 164=32; 165=34; 166=33.

As before stated, the balls 162 take the place of the U-shaped brushes 30, creating a path for a circuit operating one of the interpreting relays. Thus, the ball 162ᵇ will close a circuit from a source (not shown in Figs. 4 nor 5 but understood to correspond with the source 60) through contacts 163, 164, 165 successively and thence through the ball 162ª and one of the contacts 166, to an interpreting relay such as 66 in Fig. 1.

After rolling down the incline of the trough, a ball 162 will be carried by its momentum on a slight upgrade and after rolling off the end will strike the end of a batting member composed of two metallic strips 218 and 219, separated by insulation 220 and pivoted on the pin 221. The strips 218 and 219 are terminals of a circuit which includes a source 222 and a magnet 223. The armature of the latter is a prolongation of the strip 218. The circuit for the magnet 223 will become closed at the instant when the ball 162 alights upon the pieces 218 and 219, the result being to drive the ball 162 into a short tube 224 through which it is carried by its momentum acquired in the batting operation. The ball will now rest in a pocket 225 and against the edge of the wheel 171 as shown, for example, at 162$^d$. The pocket 225 is simply a hole drilled in the ring 226 which supports the tubes 224. But it should be noted that the pocket 225 is not on the same radial line with that of the hole 170, but somewhat back of the latter so as to be closed by the face of one of the teeth in the wheel 171. Such an arrangement obviates the difficulty that would arise from having the ball caught midway between the pocket space 225 and the space 175 between two teeth of the wheel 171. Instead of this, the ball will ride over the face of the tooth and before being utilized again will be dropped into the slot 175 next to that which it entered on the previous excursion.

From the above it will be seen that a ball 162 will be dropped and allowed to roll over its trough of contacts every instant that an impulse is detected by the relay 199. Every ball coöperating with its predecessor will play the same part in selecting one of the interpreting relays that the U-shaped contact brushes 30 do. The balls in every alternate trough will be despatched upon the receipt of positive impulses by the relay 199, while the intervening balls will be despatched by negative impulses. Every pair of troughs will contain contacts 166, connected with the interpreting relays for a single space on the line and they in turn will control a single set of the printing magnets 109 and 116 through the medium of the relays 150 and 152, as shown in Fig. 1. The intermittent movement of the wheel 171 will, therefore, take care of the line spacing the same as was accomplished by the magnets 24–29 inclusive, for with each movement of the wheel 171 one of the balls 162 will be dropped and the latter must invariably be dropped in regular order, assigning thereby a character (or a blank if the space signal is received) to each space on the line.

Since it has been shown that the interpreting relays are caused to select any desired character to be printed and that in so doing a type wheel can be arrested in any desired position, and caused to print whatever character is then opposed to the printing platen, it will be obvious that the use of this device may be extended to the actuation of a sunflower switch controlling the circuits of electrically-operated type setting and other devices. To illustrate such an application of this device reference may be had to an application for a patent made by Ralph W. Bumstead, Serial No. 266,437, filed June 22, 1905, which shows how a printing telegraph mechanism may be used as the controlling medium for the actuation of a selective device used to indicate the price fluctuations of stocks or commodities. In that application a sunflower switch is shown to distribute electrical impulses to a set of selective magnets which control the operating units for any number of stock quotation indicators. Such impulses are delivered to one or another of the magnets whenever the printing platen of the controlling printing telegraph makes a stroke. It will readily be seen, therefore, that the printing telegraph above described is applicable as the controlling medium for the operation of such an indicator; the type wheels of the printer being supplemented by sunflower switches with segments corresponding to the characters of the type wheels and trailer brushes distributing impulses at each actuation of the printing platens, so that a magnet will be energized corresponding to each character printed by the telegraph.

Furthermore, it is obvious that instead of controlling an indicating mechanism, the magnets described in the last paragraph could be used to actuate the several keys of a typesetting machine. Such an application of this invention could be made independent of the actual utilization of the printer above described. Indeed, the detector and interpreting relays could be made to actuate a set of sunflower switches for an indicator, or type-setting device without including the printer at all, the trailer brushes for the sunflower switches taking the place of the type wheels of the printer, and a set of circuit closing switches taking the place of the printing platens.

Various other modifications of this invention and applications thereof are included in the scope of the following claims.

Having fully described our invention, what we claim as new and desire to secure by Letters Patent is:—

1. In an apparatus for transmitting intelligence, means to send over a circuit a succession of electrical impulses at varying time intervals and in accordance with a code whereby each impulse separates one significant time interval from the next succeeding significant time interval and each character is indicated by the combination of a plurality of contiguous time intervals, so that the successive characters are contiguous in transmission, and means at the receiving end of the line and operated by said impulses to interpret said combination.

2. In an apparatus for transmitting intelligence, means to send over a circuit a succession of electrical impulses at varying time intervals and in accordance with a code whereby each impulse separates one significant time interval from the next succeeding significant time interval and each character is indicated by the combination of a plurality of contiguous significant time intervals, so that the successive characters are contiguous in transmission, and means at the receiving end of the line and operated by said impulses and controlled by said varying time intervals to make a visible record of the characters represented by said time intervals.

3. In an apparatus for transmitting intelligence, means to send over a circuit a succession of electrical impulses at varying time intervals and in accordance with a code whereby each impulse separates one significant time interval from the next succeeding significant time interval and each character is indicated by the combination of contiguous significant time intervals, so that the successive characters are contiguous in transmission, means at the receiving end of the circuit to detect and interpret said time intervals, and means to make a visible record of the characters constituting such interpretation.

4. In a system for the transmission of intelligence, a transmitter adapted to initiate a succession of significant electrical impulses at varying time intervals, each of which has a character representing significance, a transmitting medium, a receiver adapted to detect variations in the time intervals elapsing between successive impulses, a plurality of interpreting relays selectively actuated by said receiver, and a printing mechanism responsive to the combined action of a pair of said interpreting relays.

5. In a telegraph system, the method of transmission and recording which consists of impressing upon a circuit a succession of impulses of equal duration and at varying contiguous significant time intervals in accordance with a code wherein each pair of time intervals represents a letter, figure or other character, interpreting said pairs of time intervals, and recording their significance in typographical form.

6. In the transmission of intelligence, means to produce a succession of impulses all separated by significant intervals of time the length of which determines the significance of the signals thus produced, means to detect the signals and to record as the significance thereof a typographical character for each pair of time intervals.

7. In a telegraph system, the method of transmission and recording which consists in impressing upon a circuit a succession of impulses of alternating polarity but at varying contiguous significant time intervals in accordance with a code wherein each pair of intervals represents a letter, figure, or other character, interpreting said time intervals and recording their significance in typographical form.

8. In an intelligence-transmitting system, a transmitting record comprising impulse initiating devices variously spaced from one another, a transmitter controlled by said transmitting record, a transmitting medium, an impulse detector, a signal detecting and distributing device responsive to said impulse detector, and adapted to interpret a succession of time signals manifested by said impulse detector, and a recording device comprising several divisions to which said time signals may be successively assigned, while said recording divisions are contemporaneously actuated.

9. In a telegraph system, a transmitting record comprising impulse initiating devices arranged in accordance with a code wherein each letter, figure or other character to be transmitted is represented on the record by one such impulse-initiating device together with a space intervening between it and an adjacent impulse initiating device, a transmitter controlled by said transmitting record, a transmitting medium, an impulse detector, a signal-detecting and distributing device responsive to said impulse detector and adapted to interpret a succession of time signals manifested by said impulse detector, and a recording device comprising several divisions to which said time signals may be successively assigned while said recording divisions are contemporaneously actuated.

10. In a telegraph system, a perforated transmitting tape whose perforations vary in length and in spacing from one another in accordance with a code wherein each letter, figure, or other character to be transmitted is represented by a single perforation together with a space adjacent thereof and transmitting receiving and recording devices coöperating with said tape to transmit intelligence from one station to another.

11. In a telegraph system, a transmitter adapted to initiate a succession of impulses all separated by varying contiguous significant time intervals, and receiving and recording devices adapted to detect said impulses and to record as the significance of the time signals defined thereby a letter, figure, or other character for every pair of time intervals.

12. In a system for the transmission of intelligence, a transmitter adapted to initiate a succession of electrical impulses all of which have a character representing significance, a receiver adapted to detect variations in the time intervals elapsing between successive impulses, a plurality of interpreting relays selectively actuated by said receiver, and a printing mechanism responsive to the combined action of a pair of said interpreting relays.

13. In the transmission of intelligence, a time signal detector comprising a plurality of movable contact elements and a plurality of stationary contact elements over which the movable contact elements may be passed, means to despatch said movable contact elements successively, an interpreting device selectively actuated by the coöperation of a pair of said movable contact elements and responsive to contiguous time elements of successive signals, and a recording device controlled by said interpreting device.

14. In a telegraph system, a signal detecting and interpreting mechanism comprising a line relay, a plurality of magnets actuated thereby, a plurality of interpreting relays, operating circuits therefor, stationary contacts forming the terminals of said operating circuits, a plurality of movable contacts adapted to be despatched over said stationary contacts by said line-relay-actuated magnets and by coöperation in successive pairs adapted to select for actuation said interpreting relays in accordance with a succession of contiguous signals detected by said line relay, and means to record the significance of the signals thus detected and interpreted.

15. In a signal-detecting and interpreting device, a selective mechanism including a plurality of sets of interpreting relays, a distributing mechanism adapted to assign successive signals in rotation to said sets of interpreting relays, and a printing mechanism controlled by said interpreting relays and adapted to print contemporaneously the characters corresponding to the signals interpreted by the several sets of interpreting relays.

16. In a telegraph system, a signaling device adapted to transmit and receive a succession of impulses all separated by contiguous significant intervals of time, the duration of which is varied in accordance with a predetermined code, a signal detector, a plurality of interpreting relays selectively actuated by said signal detector in accordance with the intervals of time measured between successive impulses, and a printing mechanism controlled by said interpreting relays and adapted to record the significance of the signals interpreted.

17. In a telegraph system, transmitting and receiving instruments comprising means to transmit over a single line a succession of impulses the resultant of which defines at each station the detection of contiguous signals transmitted from the other station, said signals constituting a pair of contiguous significant time intervals for each letter, figure or other character transmitted, the time intervals for different characters being different.

18. In a telegraph system, an impulse transmitter having means to vary the time intervals elapsing between successive transmitted impulses, each time interval having a character representing significance, a receiver responsive to said impulses, and signal, distributing, interpreting and recording devices responsive to the contiguous significant time intervals defined by the impulses.

19. In a telegraph system, a transmitting tape, an impulse transmitter adapted to feed the tape through itself and control thereby the time intervals elapsing between the impulses transmitted, a receiver, a time signal distributing device, a plurality of recording units and means whereby the time signal distributing device is caused to assign successive pairs of time signals in rotation to each of the several recording units and to assign a normal value to each time interval irrespective of slight departures of the detected signals from their normal values.

20. In a telegraph system, a motor driven tape controlled transmitter, a signal detector, a signal distributing and interpreting device comprising a plurality of interpreting relays, a plurality of stationary contact elements connected therewith, movable contact elements adapted to pass over said stationary contact elements, the velocity of the movable contact elements being approximately proportioned to the speed of the transmitter so as to cause a distribution of the signals to the various interpreting relays in accordance with the nominal duration value of each signal *per se*, and regardless of slight departures of the actual duration values of said signals from the nominal duration values.

21. In a telegraph system, three or more recording units, a receiving device adapted to detect and record the significance of a rapid succession of intelligence transmitting signals and assign said signals in rotation to the recording units as fast as the signals are received, and means permitting each recording unit to perform its function within any part of the time elapsing between two assignments of signals to itself.

22. In a system for utilizing time signals in the transmission of intelligence, a plurality of interpreting units, a signal detector, a signal-distributing device adapted to assign successive signals in rotation to each of said interpreting units, a plurality of interpreting relays, means for coördinating the movements of the interpreting units so as to selectively actuate various interpreting relays in accordance with the significance of the detected signals, and a plurality of recording units, each responsive to a separate division of the interpreting relays and means to provide for recording the interpretation of a signal within any part of the time elapsing from the reception of the particular signal until the assignment of a subsequent signal to the same division of the interpreting relays.

23. In a system for utilizing time signals in the transmission of intelligence, a signal detector, a signal distributing device comprising a plurality of circuit-controlling members whose movements are successively initiated at contiguous significant intervals of time corresponding with the detected time signals, a plurality of interpreting circuits, each circuit including an interpreting relay and a contact terminal adapted to engage with one of said circuit-controlling members, and means for coördinating the movements of the circuit-controlling members in pairs so as to selectively actuate the interpreting relays in accordance with the detected time signals, and a recording device controlled by said interpreting relays and adapted to record the significance of the interpreted signals.

24. In a time signal significance recording device, a plurality of electromagnetically operated printing platens, a similar number of type bearing recording units, each unit normally movable so as to present each of its type faces successively to its printing platen, a record sheet interposed between the type-bearing-recording units and their printing platens, two sets of interpreting relays to control each recording unit, and means to coördinate the combined action of two interpreting relays, one in each set, so as to cause the arrest of a recording unit in a suitable position to print the character corresponding to the coördinated interpreting relays, and means to actuate the printing platens to impress upon the record sheet the characters corresponding to certain time signals controlling said interpreting relays.

25. In a telegraphically-controlled recording device, a plurality of type wheels loosely mounted upon a shaft, a driving mechanism adapted to rotate said type wheels with corresponding characters of each wheel normally in alinement, a printing platen for each type wheel, a printing mechanism adapted to momentarily arrest said type wheels individually in any desired position and move said platens relative to the type wheels thereby to cause an impression to be made on a record sheet of the character then opposed to said printing platen, a sunflower switch comprising a plurality of contact segments and a trailer arm carrying a pair of brushes insulated from one another and adapted each to trail over its respective set of contact segments, the position of said brushes bearing always a definite relationship to the normal position of said type wheels, a telegraphic time signal detector and interpreting device comprising a set of interpreting relays for each type wheel and electrical connections with said sunflower switch, and all substantially arranged so that after assignment of a detected time signal to any particular set of interpreting relays, the next transit of the sunflower switch brushes over a pair of contacts corresponding to the actuated interpreting relays will result in arresting the type wheel in suitable position to print the interpreted character.

26. In a telegraphically-controlled recording device, a plurality of type wheels, a set of magnets for each type wheel to determine its position for a printing operation, a time-signal-controlled selective mechanism for actuating a predetermined pair of said magnets for a given character, means for simultaneously moving said type wheels to their printing positions, means for individually arresting said type wheels in their printing positions, and means to effect a printing operation upon the arrest of each type wheel.

27. In a device of the class described, a shaft, a brush arm fast thereon, a plurality of brushes on said arm, a plurality of normally-rotating members loosely mounted upon said shaft and normally held in phase with one another and in a predetermined position with respect to said brush arm, a plurality of commutator segments arranged in sets, each set being disposed in the path of one of the brushes, an arresting device for each rotating member comprising an electromagnetically-operated pawl, a series of relays to control an operating circuit whereby said pawl is caused to engage with any one of a plurality of ratchet teeth on the rotating member, and connections between said relays and said commutator segments whereby the selective actuation of said relays in various combinations results in closing the pawl-operating circuits at the moment of passage of said brushes simultaneously over the corresponding combination of commutator segments.

28. In a device of the class described, a commutating switch comprising a plurality of contact segments, a selector unit associated with each of said segments, the latter being arranged in more than one orbit, a plurality of brushes each adapted to wipe over the segments of its own orbit, a plurality of units normally rotating in synchronism with said brushes, a selectably-operated mechanism effective upon said rotating units, and means to momentarily arrest any one of said rotating units in any desired position as the result of said brushes passing simultaneously over a combination of said segments which have been connected with said selectably-operated mechanism by said selector units.

29. In a device of the class described, a plurality of selector units, a commutating switch comprising a plurality of contact segments each of which is associated with a selector unit, said contact segments being arranged in more than one orbit, a plurality of brushes each adapted to wipe over the segments of its own orbit, a plurality of printing platens and opposed thereto a set of type wheels, a selectably-operated mechanism effective upon said platens, means normally to rotate said type wheels in synchronism with said brushes, a recording sheet interposed between said printing platens and said type wheels, and means whereby said printing platens are caused to strike said recording sheet against any particular type face on a type wheel as a result of said brushes passing simultaneously over a combination of said segments which have been connected with said selectably-operated mechanism by said selector units.

30. In a device of the class described, a set of type wheels, an independent printing platen for each type wheel, a record sheet adapted to be drawn between said type wheels and said printing platens, a driving mechanism for said type wheels and for said record sheet, and an actuating mechanism for said printing platens adapted to make impressions from their respective type wheels upon said record sheet, each actuation of a printing platen being so timed in reference to the rotation of its type wheel as to make an impression of any selected letter or other character, and the actuating mechanism being adapted to move several of the printing platens simultaneously thereby to cause several type wheels to print simultaneously.

31. In a device of the class described, a telegraph signal detector and interpreting device adapted to receive and interpret messages at a fixed average rate of speed per character, a printing mechanism comprising a plurality of printing units, each of which operates at a slower rate of speed per character than the speed of said detector and interpreting device, a distributing system adapted to assign successive character signals in rotation to the several printing units, and an actuating mechanism for said printing units adapted to operate several of them either simultaneously or successively or out of the order in which the individual assignments are made, and irrespective of any synchronism with said detector and interpreting device, albeit said printing units in the aggregate are adapted to record said messages as fast as the signals therefor are detected and interpreted.

32. In a device of the class described, a time signal interpreting device comprising a plurality of contact chutes containing contacts which are normally insulated from one another, a metal ball for each chute adapted to roll over said contacts and close a circuit between two of the same adjacently disposed, a plurality of interpreting relays whose magnets are in circuits terminating in some of said contacts, a telegraph transmitter and receiver adapted to transmit and receive intelligence in the form of time signals, and a recording device adapted to record the significance of said signals in typographical form, said recording device being controlled by said interpreting relays, each of which is selectively actuated by a circuit closed through a plurality of said contacts and more than one ball.

33. In a device of the class described, a time signal interpreting device comprising a plurality of contact chutes containing contacts which are normally insulated from one another, a metal ball for each chute adapted to roll over said contacts and close a circuit between two of the same adjacently disposed, a releasing device adapted to despatch said balls successively over their respective chutes at intervals of time corresponding to a succession of time signals, the latter being the medium of intelligence transmission from one station to another, a plurality of interpreting relays selectively actuated by the closing of circuits through two of said balls during their passage simultaneously over certain contacts of their respective chutes, means to record the significance of the signals thus interpreted, and means to restore said balls to their starting positions.

In testimony whereof, we have signed our names to this specification, in the presence of two subscribing witnesses.

ALBERT H. BUMSTEAD.
RALPH W. BUMSTEAD.

Witnesses:
  LOUIS C. SMITH,
  THOMAS J. DRUMMOND.